April 29, 1930. W. C. DE ROO 1,756,454
SPRING COUNTERBALANCE FOR DRILL SPINDLES
Filed Sept. 16, 1927   2 Sheets-Sheet 1

Inventor
William C. De Roo,
By Murray and Bugelter
Attorneys

April 29, 1930.  W. C. DE ROO  1,756,454

SPRING COUNTERBALANCE FOR DRILL SPINDLES

Filed Sept. 16, 1927   2 Sheets-Sheet 2

Inventor
William C. DeRoo,
By Murray and Zugelter
Attorneys

Patented Apr. 29, 1930

1,756,454

UNITED STATES PATENT OFFICE

WILLIAM C. DE ROO, OF CINCINNATI, OHIO, ASSIGNOR TO THE FOSDICK MACHINE TOOL COMPANY, OF CINCINNATI, OHIO, A CORPORATION OF OHIO

SPRING COUNTERBALANCE FOR DRILL SPINDLES

Application filed September 16, 1927. Serial No. 219,945.

This invention relates to improvements in a drill press structure and has for an object the provision of an adjustable tension spring counter-balance for the spindle with which there is associated a safety catch mechanism operable to prevent dropping of the spindle in the event of failure of the spring counter-balance.

Another object is to provide a safety catch mechanism for the purpose stated which is always in condition for positive operation to prevent dropping of the spindle.

Another object is to provide a device of this kind which is simple in construction and assembly.

These and other objects are attained by the means described herein and disclosed in the accompanying drawings, in which.

Figure 1:
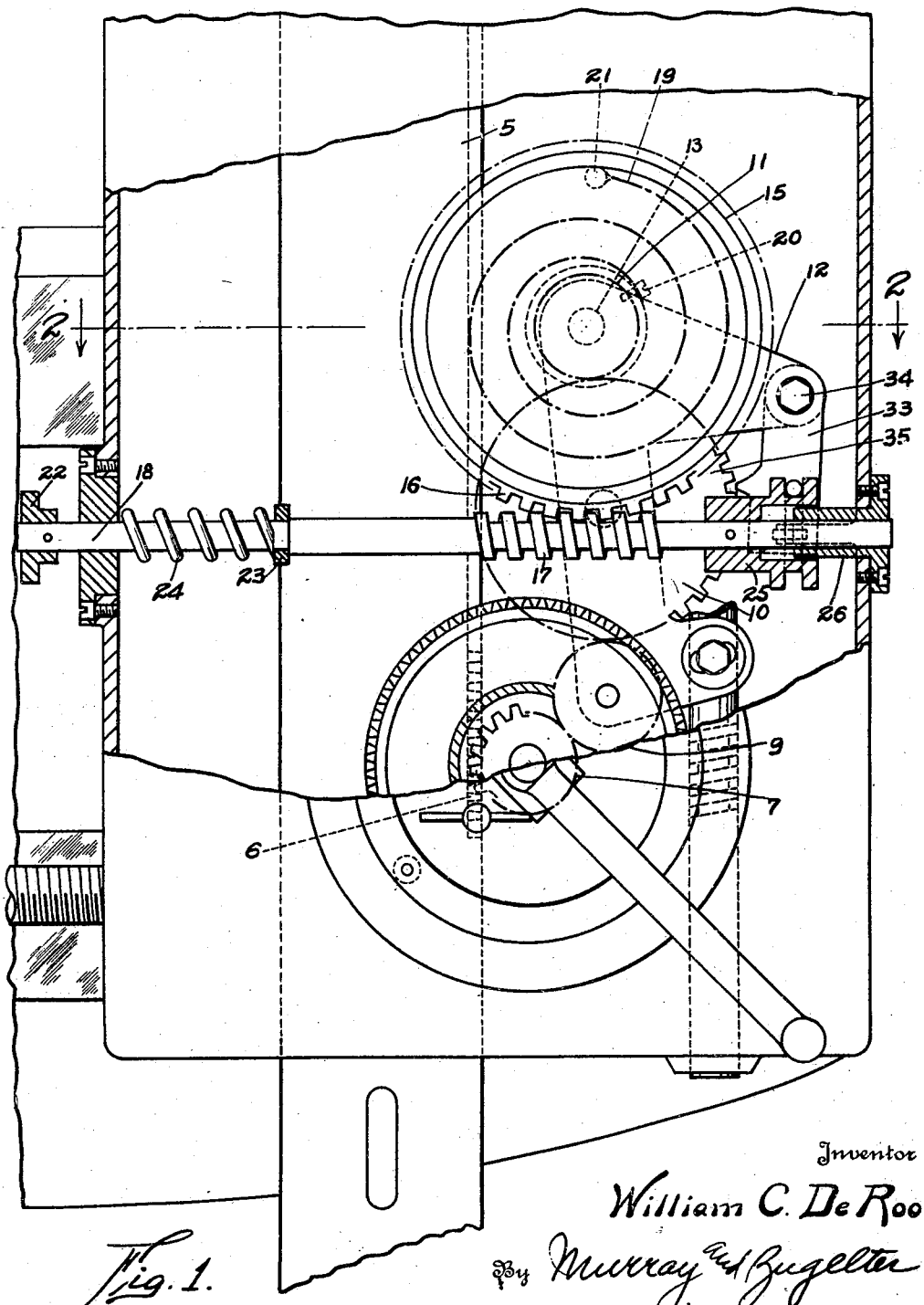
Fig. 1 is a fragmental elevation of a drill press embodying the invention, parts being broken away.

As shown in the drawings the spindle structure 5 provided with the usual rack teeth 6 is adapted to be held and reciprocated through the agency of a gear 7 meshing with the rack 6 and adapted to be manually operated as well as power operated. The gear 7 is carried by the shaft 8 and is connected with a gear train comprising gears 9, 10 and 11 which are suitably mounted upon a plate or bracket 12. A shaft 13 has the gear 11 secured thereto and finds its rear bearing in the casing 14 which surrounds the mechanism. The shaft 13 extends into a hollow drum 15 which is normally held against rotation by the engagement of worm teeth 16 on the drum engaging with a worm 17 carried by a transverse shaft 18. A suitable spring 19 made after the fashion of a clock spring has its one end secured to the shaft 13 by any suitable means such as a screw 20 while the opposite end of the spring is secured to a suitable pin 21 fixed interiorly of the body of the drum 15. From the foregoing it will be apparent that when the gear 7 is actuated in one direction it will lower the spindle 5 by reason of its engagement with the rack 6, and at the same time will rotate the shaft 13 through gears 9, 10 and 11, thereby winding up or placing a tension upon the spring 19, thus opposing the tendency of the spindle to drop by gravity because of the spring resistance to movement of the gear train. When the gears are actuated in the opposite direction the spindle is raised and the spring 19 is unwound or loosened to some extent. The tension of the spring 19 may be adjusted to effect a perfect counterbalance for various weights, such as tools carried by the spindle by turning the shaft 18 by means of knob 22 carried thereby. The turning of the shaft 18 effects rotation of the drum 15, thereby winding up or releasing the spring 19 to the desired degree. It will be apparent that in this way a nice counter-balance for the spindle may be attained under all conditions and that so long as the spring 19 is effective, the spindle may be manipulated with great ease. This structure avoids the necessity for the commonly used chain and counter-weight.

Figure 2:
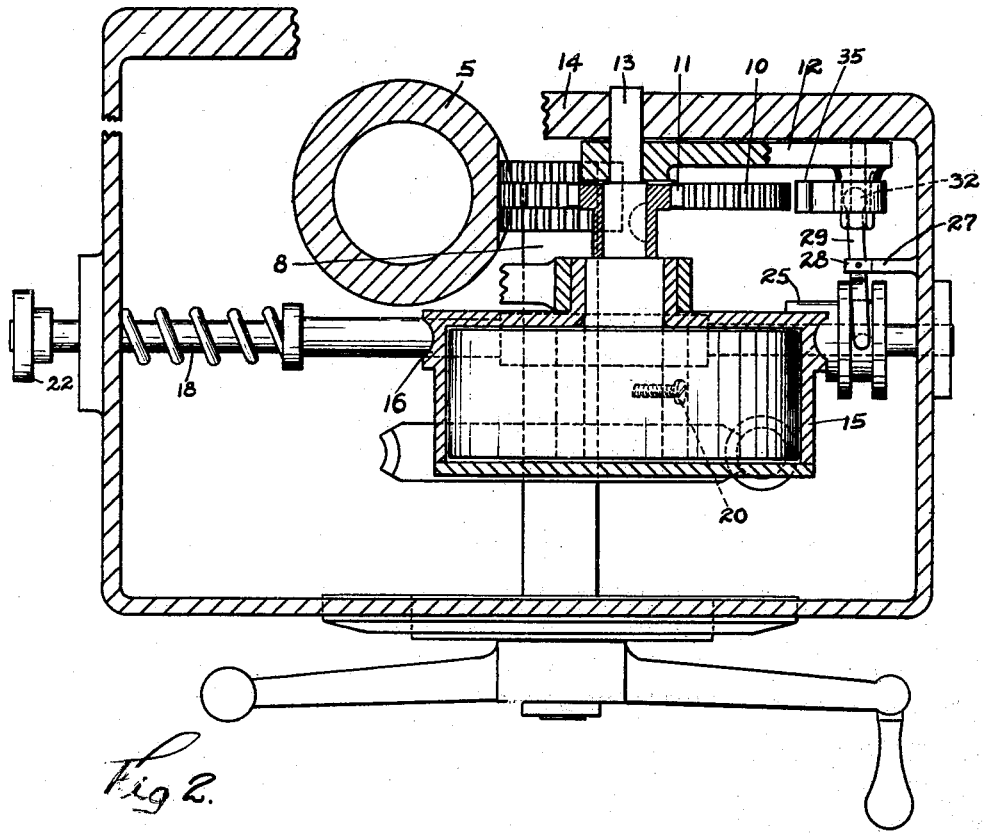
Fig. 2 is a view taken on line 2—2 of Fig. 1.
Figure 3:
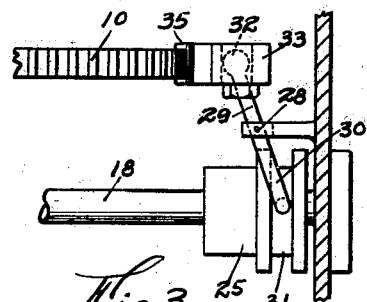
Fig. 3 is a fragmental detail of the safety catch in an operative position for locking the spindle against dropping.

With the proper kind of spring 19, there is little likelihood of breakage or release of the spring to permit dropping of the spindle, nevertheless in order to provide for such an emergency, the simple and effective safety catch of the invention is provided. It will be noted in Fig. 1 that the shaft 18 carries a collar 23 against which a strong compression spring 24 abuts for urging the shaft 18 to the right. The worm on the shaft 18 however meshing with the housing 15 normally precludes movement in that direction because of the tension of the spring 19. A spool 25 is suitably secured to the shaft 18 and is capable of reciprocation over a fixed sleeve 26 upon longitudinal movement of the shaft. As shown in Fig. 2 a suitable projection 27 has a clevis 28 formed at its outer end in which is pivotally mounted a bar 29. A yoke 30 which is preferably integral with the bar 29 has suitable projections which are disposed in the groove 31 of spool 25, so that reciprocation of the shaft 18 and spool 25 will effect movement of the bar 29 about its pivotal mounting in the clevis 28. The opposite end 32 of the bar has a ball swivel connection with a catch 33 which is pivotally mounted as at 34 upon plate or bracket 12. The catch 33 carries a single strong tooth 35 which engages the teeth of gear 10 and locks it against rotation when said catch is moved about its pivotal mounting through the agency of bar 29 and spool 25. In the event of breakage or release of the spring 19, all resistance would immediately be removed from the drum 15 and gravity would cause the spindle 5 to move downwardly thereby actuating the gear train. However since the resistance to movement of the drum 15 is relieved, the spring 24 will immediately push the shaft 18 longitudinally toward the right, thereby moving the spool to the right and projecting the catch 33 to the left so that the tooth 35 will engage the gear 10 and lock it. This precludes all further movement of the gears and spindle so that the machine cannot be again operated until the spring 19 is again repaired or replaced. This setting of the catch is entirely automatic so that there is entirely eliminated any element of danger of dropping of the spindle upon failure of the counter-balance spring.

What is claimed is:—

1. In a device of the class described the combination of a vertically adjustable tool spindle having rack teeth thereon, a gear meshing with the rack rotatable for raising and lowering the spindle, a shaft, a coil spring having its one end attached to said shaft, a gear train operative through the first mentioned gear for actuating the shaft whereby to wind and unwind the spring for effecting a spring counter-balance of the spindle, a movable spring pressed transverse shaft, means connecting the transverse shaft and the second end of the coil spring whereby the tension on the coil spring normally resists movement of the spring pressed shaft, a toothed catch adapted for movement into and out of the path of one of the gears in said gear train and means on said transverse shaft for effecting movement of the catch for locking the gear train upon failure of the coil spring to oppose movement of the spring pressed shaft.

2. In a device of the class described the combination of a vertically adjustable tool spindle, an actuating gear for said vertically adjustable tool spindle, a drum, a coil spring secured at its one end to the drum, a shaft supporting the drum and having the opposite end of the coil spring secured thereto, gears connecting the actuating gear and said shaft, a transverse shaft adjacent the drum, a worm on said transverse shaft, worm teeth on the drum engaging said worm, said transverse shaft being rotatable for actuating the drum whereby to adjust the tension of the coil spring, means urging the transverse shaft against tension of the coil spring and a catch operable by the transverse shaft upon failure of the coil spring for locking the gears to preclude dropping of the spindle.

3. In a device of the class described, the combination of a vertically adjustable tool spindle, a pinion rotatable for raising and lowering the same, a shaft, gearing connecting said shaft to said pinion, a coil spring secured at one end to said shaft, and constituting a counterbalance for said spindle, a movable member, the other end of said spring being attached to said member, a slidable rod disposed transversely of the shaft and engaging said member and maintained in one position by the tension of said spring, a second spring pressing upon said rod and held under compression by the tension of the first-named spring and a catch actuated by said rod to engage and stop the rotation of said gearing upon the failure of said first spring.

In testimony whereof, I have hereunto subscribed my name this 2nd day of September, 1927.

WILLIAM C. DE ROO.